Jan. 19, 1954    H. ALPERSTEIN    2,666,680
EXTENDABLE TABLE WITH FOLDABLE LEAVES
Filed March 16, 1953    2 Sheets-Sheet 1

INVENTOR.
HARRY ALPERSTEIN
by Mock & Blum
ATTORNEYS

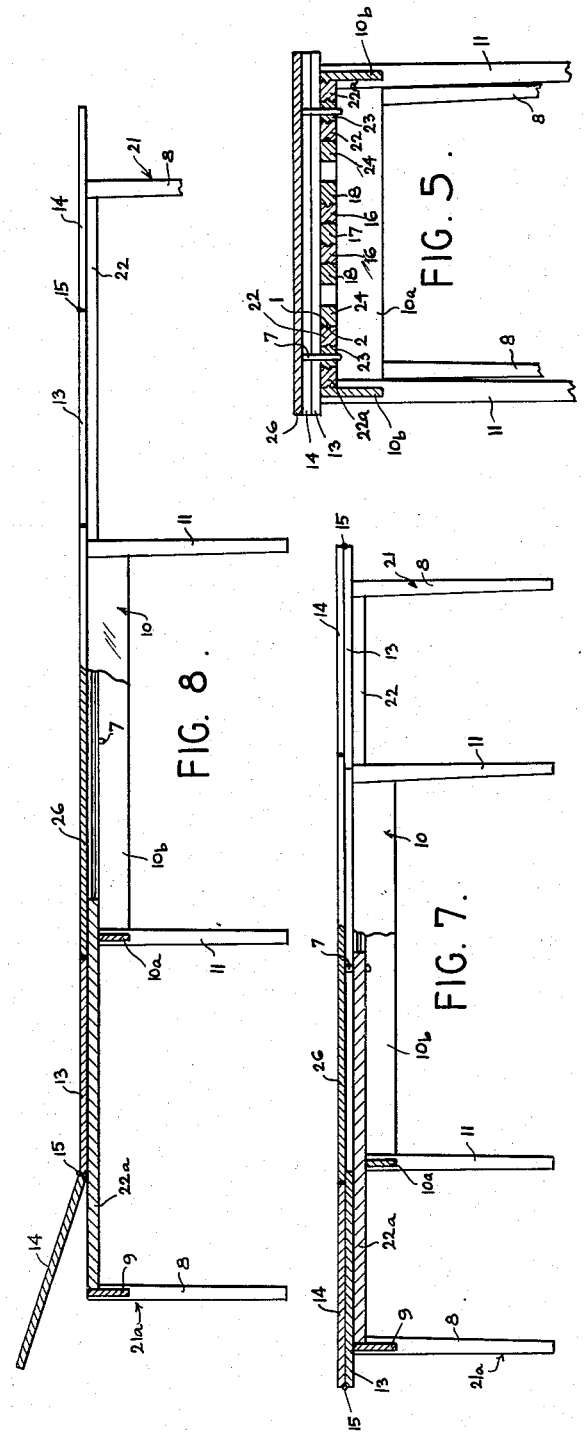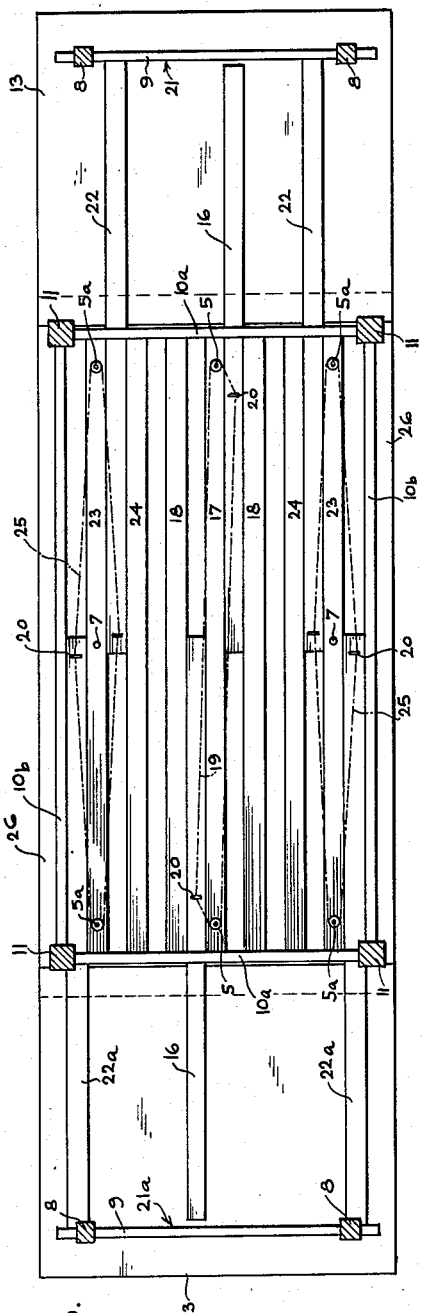

Patented Jan. 19, 1954

2,666,680

UNITED STATES PATENT OFFICE 2,666,680

EXTENDABLE TABLE WITH FOLDABLE LEAVES

Harry Alperstein, Belle Harbor, N. Y.

Application March 16, 1953, Serial No. 342,364

2 Claims. (Cl. 311—54)

This invention relates to an improved extension table.

In accordance with my invention, I provide a table which has a longitudinally extending main frame and end extension frames which are mounted on said main frame at each end thereof. Said end frames are longitudinally movable in extension and retraction movements. I provide inner end extension leaves which are also mounted on said main frame for longitudinal movement and which are adapted to be supported by said extension frames when in extended position. I also provide outer extension leaves which are hingedly connected to the inner extension leaves, said outer extension leaves having retracted positions in which they overlie the inner extension leaves, as well as extended positions in which they rest directly upon the extension frames and are located longitudinally outwardly of said inner extension leaves.

Finally, I provide a center leaf which is mounted on the main frame for transverse movement. When the extension frames and the extension leaves are completely retracted, said center leaf is adapted to overlie the extension leaves. In an intermediate extended position of the extension frames and of the inner extension leaves, said inner extension leaves are located longitudinally outwardly of said center leaf.

One important object of my invention is to provide simple, improved means for supporting the center leaf on the plane of the outer extension leaves when the inner leaves are in their intermediate extended positions. In part, I accomplish this object by hinging the outer extension leaves to the inner extension leaves at the outer lateral edges thereof, and by making the outer extension leaves of shorter length than the inner extension leaf. As a result of this construction, it is possible to provide ledges for reception of the front and rear end portions of the center leaf, in the intermediate extended position of the table.

Said table also has a fully extended position in which the outer extension leaves are positioned longitudinally outwardly of the inner extension leaves and are supported by the extension frames.

Another important feature of my invention is the provision of improved means coupling the inner extension leaves to each other, and similar means coupling the extension frames to each other, whereby manual movement of one of the inner extension leaves or of one of the extension frames results automatically in the appropriate movement of the other inner extension leaf or the other extension frame.

Other objects and advantages of my invention will become apparent from the following description, in conjunction with the annexed drawings, in which a preferred embodiment is disclosed. The drawings are approximately to scale of a working model of the invention.

In the drawings,

Fig. 5 is a section on line 5—5 of Fig. 1.

Fig. 6 is a view similar to Fig. 2, showing the table partly extended.

Fig. 7 is a longitudinal section, partly in side elevation, of the table, showing it partly extended.

Fig. 8 is a view similar to Fig. 7, showing the table fully extended.

Figure 1:
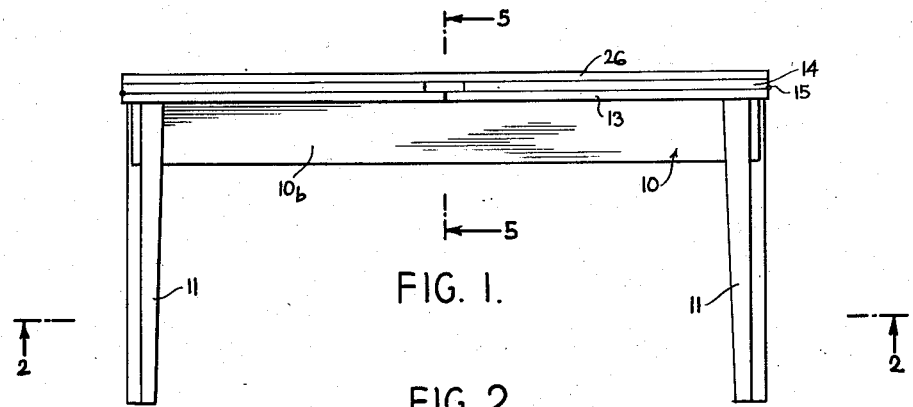
Fig. 1 is a side elevation of my improved table, showing same in retracted position.

Upon reference to the drawings in detail, it will be noted that they show a main table frame 10 which is substantially rectangular and which extends longitudinally. Said frame 10 comprises a pair of longitudinally and transversely extending side bars 10b and a pair of laterally and transversely extending end bars 10a. Frame 10 also has the usual legs 11 at the corners thereof, said frame bars being respectively connected between respective pairs of legs 11. The means for holding frame 10 together are conventional and are not shown in detail.

The top faces of side frame bars 10b and the top faces of legs 11 are located in a common horizontal plane, and the top faces of end frame bars 10a are located below said plane.

A plurality of longitudinal guide bars are fixed at their respective ends to the upper faces of the respective end frame bars 10a. Said longitudinal guide bars, which are laterally spaced from each other, comprise a central guide bar 17, guide bars 18 located on either side of bar 17, guide bars 24 respectively located laterally outwardly of the respective bars 18, and guide bars 23 respectively located laterally outwardly of the respective bars 24. Said guide bars 23 are respectively laterally spaced inwardly from the respective frame side bars 10b. These longitudinal guide bars are clearly shown in Figs. 2, 5 and 6.

The upper faces of the longitudinal guide bars 17, 18, 23 and 24 are all located in the common horizontal plane of the top faces of bars 10b and legs 11.

Figure 3:
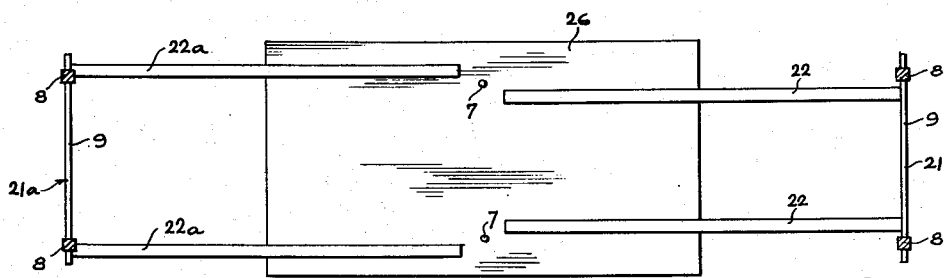
Fig. 3 is a view similar to Fig. 2, but showing only the center leaf and the end frames, the latter being shown extended.

I provide a pair of end extension frames 21 and 21a, which are clearly shown in Fig. 3 and in other views. Each said extension frame 21 and 21a comprises a laterally and transversely extending end bar 9 and a pair of legs 8 mounted on said end bar 9. Said frame 21 also comprises a pair of laterally spaced, longitudinally extending slide bars 22 attached to end bar 9. Said frame 21a also comprises a pair of laterally spaced, longitudinally extending slide bars 22a attached to end bar 9.

In the assembly of main frame 10 and extension frames 21 and 21a, extension frame bar 9 of frame 21 is positioned longitudinally outwardly of one end of frame 10, with extension bars 22 respectively extending frictionally slidably between respective guide bars 23 and 24. Extension frame bar 9 of frame 21a is positioned longitudinally outwardly of the other end of frame 10, with extension bars 22a respectively extending frictionally slidably between a respective guide bar 23 and a respective frame bar 10b. As a result, extension frames 21 and 21a are respectively slidable between their retracted positions, clearly shown in Figs. 1 and 2, in which their frame bars 9 and legs 8 are positioned adjacent the respective ends of main frame 10, and their fully extended positions, clearly shown in Fig. 8, in which the bars 9 and legs 8 are remotely spaced from the respective ends of main frame 10. Figs. 6 and 7 show extension frames 21 and 21a in respective intermediate extended positions, in which the frame bars 9 and legs 8 are positioned intermediate their respective retracted and fully extended positions.

The upper faces of the longitudinal slide bars 22 and 22a are all located in the common horizontal plane of the top faces of bars 10b and legs 11.

In the retracted positions of extension frames 21 and 21a, the respective bars 22 and 22a extend almost the full length of main frame 10, thereby permitting maximum extension of frames 21 and 21a in relation to the length of frame 10.

My improved table also comprises a center table leaf 26, two inner extension leaves 13 and two outer extension leaves 14.

Figure 4:
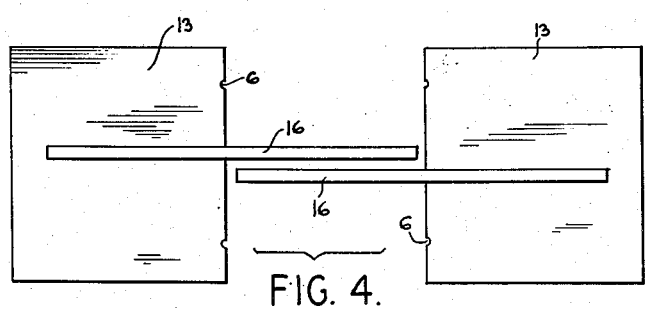
Fig. 4 is an exploded bottom plan view of the intermediate extension leaves.

As is clearly shown in Fig. 4 and in other views, each said inner extension leaf 13 is substantially rectangular in shape and has a longitudinally extending slide bar 16 mounted on the lower face thereof. Said bars 16 also extend longitudinally inwardly of the respective proximate edges of said leaves 13. Said leaves 13 are adapted to be mounted on the table with said slide bars 16 respectively extending frictionally slidably between the center guide bar 17 and the respective guide bars 18. As a result, leaves 13 are respectively slidable between their retracted positions, clearly shown in Figs. 1 and 2, in which the inner edges of leaves 13 substantially abut each other, and their fully extended positions, clearly shown in Fig. 8, in which the inner edges of leaves 13 are located slightly outwardly of the respective end pairs of legs 11. Figs. 6 and 7 show extension leaves 13 in respective intermediate extended positions, in which the inner edges thereof are located in transverse registration with the top faces of the respective end pairs of legs 11.

Said leaves 13 rest frictionally slidably upon the respective slide bars 22 and 22a in all positions of said leaves 13, and also rest frictionally slidably upon the fixed guide bars of main frame 10 in the respective retracted positions of said leaves 13.

In the retracted positions of extension leaves 13, the respective bars 16 extend almost the full length of main frame 10, thereby permitting maximum extension of leaves 13 in relation to the length of frame 10.

A lateral end edge of each outer extension leaf 14 is connected to the outer lateral end edge of a respective inner extension leaf 13, by means of a hinge 15. Said outer extension leaves 14 have respective retracted positions, clearly shown in Figs. 1, 5 and 6, in which they rest upon the upper faces of the respective inner extension leaves 13. Said outer extension leaves have respective extended positions, clearly shown in Fig. 8, in which they rest upon the upper faces of the respective bars 22 and 22a of the respective frames 21 and 21a, said leaves 14 then extending outwardly of leaves 13 and also protruding beyond the respective end pairs of legs 8.

Leaves 14 are respectively slightly shorter than leaves 13. Therefore, in the retracted positions of leaves 14, the inner edges thereof are located slightly outwardly of the respective inner edges of leaves 13. This is clearly shown in Figs. 1 and 7.

Center leaf 26 has a pair of depending pins 7, as clearly shown in Figs. 3 and 5. Said pins 7 are respectively vertically slidable in suitable through-and-through openings in the respective guide bars 23. Said pins 7 are located at the longitudinal center line of main frame 10. Leaves 13 have notches 6 in the respective inner edges thereof, as clearly shown in Fig. 4, so as to provide suitable openings for the respective pins 7 when leaves 13 are placed in their retracted positions. Optionally, the inner edges of leaves 13 may be slightly spaced longitudinally from each other in their retracted positions, to provide clearance for pins 7.

Center leaf 26 has an upper position, clearly shown in Figs. 1 and 5, in which it rests upon leaves 14, said leaves 14 in turn respectively resting upon the retracted leaves 13. Center leaf 26 has an intermediate position, clearly shown in Fig. 7, in which it is located longitudinally between the outer extension leaves 14 and rests upon the portions of the partially extended leaves 13 which are located inwardly of said leaves 14. Center leaf 26 has a lower position, clearly shown in Fig. 8, in which it is located longitudinally between the inner extension leaves 13 and rests directly upon the top of main frame 10.

Figure 2:
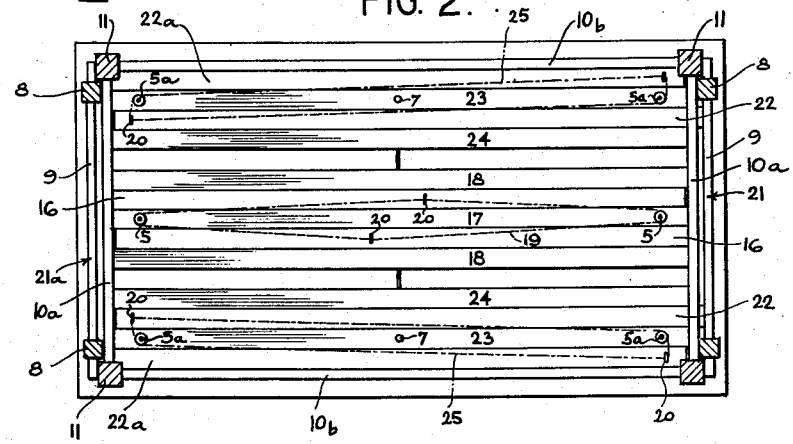
Fig. 2 is a section on line 2—2 of Fig. 1.

As is clearly shown in Figs. 2 and 6, means are optionally and preferably provided for coupling frames 21 and 21a, to permit simultaneous extension or retraction thereof, and also for coupling extension leaves 13, to permit simultaneous extension or retraction thereof. A pair of pulleys 5 are respectively mounted on the respective ends of guide bar 17 on the lower face thereof, so as to be turnable about respective transverse axes. A continuous cable 19 is mounted on said pulleys 5. Said cable 19 is fixed at two points thereof, by any suitable fastening means 20, to the lower faces of the respective slide bars 16 at intermediate points thereof. It will be apparent that when either of the leaves 13 is manually extended or retracted, the other leaf 13 will be automatically correspondingly extended or retracted. Similarly, pulleys 5a are mounted on each end of each guide bar 23. A continuous cable 25 is mounted on each pair of pulleys 5a. Said cable 25 is fixed by means 20 to the respective slide bars 22 and 22a adjacent said bar 23. It will be apparent that when either of the extension frames 21 or 21a is manually extended or retracted, the other extension frame will be automatically correspondingly extended or retracted.

Certain of the details of construction, such as optional bracing members for frame 10 and for frames 21 and 21a, the details of the manner of assembly of the various longitudinal bars to the frames, and the manner of mounting the pulleys, have been omitted from the drawings, in order that the essential features of the invention will not be obscured.

As is clearly shown in Fig. 5, the side faces of the guide bars 17, 18, 24, 23 and 10b are optionally with longitudinal ridges 1 which ride in corresponding longitudinal grooves 2 in the side faces of the slide bars 16, 22 and 22a. As a result of this construction, or other suitable construction, each slide bar moves smoothly between its associated guide bars, and transverse movement of the slide bars with respect to frame 10 is substantially prevented.

The operations of extending the table from its retracted position of Figs. 1 and 2 to its partly extended position of Figs. 6 and 7, and finally to its fully extended position of Fig. 8 are as follows:

One of the extension frames 21 or 21a is manually moved from its retracted position of Fig. 1 to its intermediate extended position of Figs. 6 and 7, the other extension frame being thereby automatically moved to a corresponding position. One of the inner extension leaves 13 is then manually moved from its retracted position of Fig. 1 to its intermediate extended position of Figs. 6 and 7, the other leaf 13 being thereby automatically moved to a corresponding position. Outer extension leaves 14 are now located longitudinally outwardly of center leaf 26, which drops downwardly until it rests upon the portions of the leaves 13 which are located inwardly of leaves 14. This is clearly shown in Fig. 7. In this intermediate extended position of the table, leaf 26 and leaves 14 provide a common, co-planar table top.

When it is desired to extend the table fully, the extension frames 21 and 21a are moved outwardly, by manual manipulation of either of said frames, to their fully extended positions of Fig. 8. Inner extension leaves 13 are moved a slight distance outwardly, by manual manipulation of either of said leaves, to their fully extended positions of Fig. 8. Said leaves 13 are now located longitudinally outwardly of center leaf 26, which drops downwardly until it rests upon main frame 10 and upon the various fixed guide bars. This is clearly shown in Fig. 8. Leaves 14 are then turned upon their hinges 15 until they rest upon the respective guide bars 22 and 22a and protrude beyond the ends of the respective frames 21 and 21a. In this fully extended position of the table, leaf 26, leaves 13 and leaves 14 provide a common, co-planar table top.

It will be apparent that optionally the table may be moved directly from its retracted position to its fully extended position. The steps involved in retracting the table from either of its extended positions do not require any detailed description. In the retraction operation, it is necessary to raise center leaf 26 manually to permit retraction of leaves 13 and of leaves 14.

While I have disclosed a preferred embodiment of my invention and have indicated various changes, additions and omissions which may be made therein, it will be apparent that various other changes, additions and omissions may be made in my invention without departing from the scope and spirit thereof.

In the working model of the table illustrated in the drawings, the top of the table when fully retracted was approximately 3 feet wide and 5 feet long. When the table was extended to its intermediate extended position, the top was approximately 10 feet long. When the table was fully extended, the top was slightly less than 15 feet long.

I claim:

1. An extension table comprising a longitudinally extending frame adapted to rest upon a floor, a pair of inner extension leaves, means mounting said inner extension leaves on top of said frame so that they are longitudinally aligned and longitudinally movable, a pair of outer extension leaves respectively hingedly connected to said inner extension leaves at the respective outer edges thereof, said outer extension leaves being respectively movable between positions in which they overlie and rest upon said respective inner leaves and positions in which they are in longitudinal alignment with said inner leaves, said outer extension leaves being of shorter length than said inner extension leaves, a center leaf, means mounting said center leaf on top of said frame and permitting vertical movement of said center leaf, said leaves being co-operatively movable to determine a retracted condition of said table in which said center leaf rests upon said outer extension leaves and in which said outer extension leaves rest upon said inner extension leaves, a partially extended condition of said table in which said center leaf is positioned longitudinally between said outer extension leaves and in which said center leaf and said outer extension leaves rest upon said inner extension leaves, and a fully extended condition of said table in which said center leaf is positioned longitudinally between said inner extension leaves and rests directly upon said frame.

2. An extension table comprising a longitudinally extending frame adapted to rest upon a floor, a pair of inner extension leaves, means mounting said inner extension leaves on top of said frame so that they are longitudinally aligned and are longitudinally movable between respective retracted positions in which they are proximate to each other and substantially rest upon the top of said frame, and respective extended positions in which they are remote from each other and respectively protrude forwardly and rearwardly beyond said frame, a pair of outer extension leaves respectively hingedly connected to said inner extension leaves at the respective outer lateral edges thereof, said outer extension leaves being respectively movable between positions in which they overlie and rest upon said respective inner leaves and positions in which they are in longitudinal alignment with said inner leaves, means attached to said frame for supporting said outer extension leaves in the latter positions thereof, the inner lateral edge of each said outer extension leaf when overlying an inner extension leaf being located longitudinally outwardly of the inner lateral edge of said inner extension leaf, a center leaf, means mounting said center leaf on top of said frame and permitting vertical movement of said center leaf between a top position in which it overlies said outer extension leaves when said outer extension leaves overlie said inner extension leaves and said inner extension leaves are retracted, a second position in which it rests upon said inner extension leaves when said outer extension leaves overlie said inner extension leaves and said inner extension leaves are placed in an intermediate position in which said center leaf is located longitudinally inwardly of said outer extension leaves, and a bottom position in which it is located between said inner extension leaves and rests upon said frame when said inner extension leaves are in their extended positions.

HARRY ALPERSTEIN.

References Cited in the file of this patent

UNITED STATES PATENTS

| Number | Name | Date |
|---|---|---|
| 529,140 | Schnarr | Nov. 13, 1894 |
| 556,387 | Unger | Mar. 17, 1896 |
| 1,836,883 | Stone | Dec. 15, 1931 |
| 2,071,729 | Charak | Feb. 23, 1937 |

FOREIGN PATENTS

| Number | Country | Date |
|---|---|---|
| 678,442 | Germany | July 15, 1939 |